(12) United States Patent
Moon

(10) Patent No.: US 11,155,232 B2
(45) Date of Patent: Oct. 26, 2021

(54) FOLDING METHOD OF FAR-SIDE AIRBAG APPARATUS

(71) Applicant: HYUNDAI MOBIS CO., LTD., Seoul (KR)

(72) Inventor: Geon Woong Moon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 196 days.

(21) Appl. No.: 16/521,874

(22) Filed: Jul. 25, 2019

(65) Prior Publication Data

US 2020/0047705 A1 Feb. 13, 2020

(30) Foreign Application Priority Data

Aug. 7, 2018 (KR) .................. 10-2018-0091776

(51) Int. Cl.
*B60R 21/237* (2006.01)
*B60R 21/2338* (2011.01)

(52) U.S. Cl.
CPC ........ *B60R 21/237* (2013.01); *B60R 21/2338* (2013.01); *B60R 2021/2375* (2013.01)

(58) Field of Classification Search
CPC .......... B60R 21/237; B60R 2021/2375; B60R 2021/23386; B60R 21/2338; B60R 2021/23161; B60R 21/23138
See application file for complete search history.

(56) References Cited

U.S. PATENT DOCUMENTS

| | | | |
|---|---|---|---|
| 6,213,500 B1* | 4/2001 | Jost ................. | B60R 21/201 280/730.2 |
| 2005/0070414 A1* | 3/2005 | Schneider ........ | B60R 21/237 493/405 |
| 2006/0220359 A1* | 10/2006 | Sato ................ | B60R 21/23138 280/730.2 |
| 2009/0206585 A1* | 8/2009 | Honda ............. | B60R 21/207 280/730.2 |
| 2010/0001500 A1* | 1/2010 | Feller ............... | B60R 21/237 280/743.1 |
| 2016/0229369 A1* | 8/2016 | Thomas ........... | B60R 21/231 |
| 2017/0158160 A1* | 6/2017 | Sugimori ......... | B60R 21/264 |
| 2018/0118150 A1* | 5/2018 | Kwon .............. | B60R 21/207 |
| 2018/0290619 A1* | 10/2018 | Kitagawa ........ | B60R 21/23138 |
| 2019/0001916 A1* | 1/2019 | Jo ................... | B60R 21/23138 |

(Continued)

FOREIGN PATENT DOCUMENTS

| CN | 101659248 A | * | 3/2010 | ........ B60R 21/237 |
|---|---|---|---|---|
| CN | 103029674 A | | 4/2013 | |

(Continued)

OTHER PUBLICATIONS

Office Action dated Jul. 13, 2021 in corresponding Chinese Application No. 201910717374.8.

*Primary Examiner* — Karen Beck
(74) *Attorney, Agent, or Firm* — NovoTechIP International PLLC

(57) ABSTRACT

A folding method of a far-side airbag apparatus may include: a first folding step of folding an upper portion of an airbag sheet toward an inboard side; a second folding step of folding both widthwise sides of the airbag sheet toward an outboard side; a third folding step of folding the upper portion of the airbag sheet toward the inboard side; and a fourth folding step of roll-folding the airbag sheet.

11 Claims, 17 Drawing Sheets

(56) References Cited

U.S. PATENT DOCUMENTS

| | | | |
|---|---|---|---|
| 2019/0061675 A1* | 2/2019 | Kwon | B60R 21/233 |
| 2019/0092271 A1* | 3/2019 | Park | B60R 21/207 |
| 2019/0168704 A1* | 6/2019 | Wiscombe | B60R 21/237 |
| 2019/0283700 A1* | 9/2019 | Kwon | B60R 21/207 |
| 2020/0047705 A1* | 2/2020 | Moon | B60R 21/23138 |
| 2020/0047706 A1* | 2/2020 | Ivarsson | B60R 21/237 |
| 2020/0101932 A1* | 4/2020 | Ota | B60R 21/23138 |
| 2020/0254960 A1* | 8/2020 | Kobayashi | B60R 21/237 |
| 2020/0369232 A1* | 11/2020 | Kobayashi | B60R 21/2176 |
| 2020/0384941 A1* | 12/2020 | Kwon | B60R 21/2338 |
| 2020/0406850 A1* | 12/2020 | Takeuchi | B60R 21/231 |
| 2020/0406854 A1* | 12/2020 | Moon | B60R 21/26 |
| 2021/0031717 A1* | 2/2021 | Fuma | B60R 21/207 |
| 2021/0046895 A1* | 2/2021 | Kobayashi | B60R 21/26 |
| 2021/0094502 A1* | 4/2021 | Jo | B60R 21/233 |
| 2021/0101552 A1* | 4/2021 | Kim | B60R 21/2338 |

FOREIGN PATENT DOCUMENTS

| | | | | |
|---|---|---|---|---|
| CN | 108016397 A | | 5/2018 | |
| EP | 1592548 B1 | * | 8/2007 | B60R 21/237 |
| GB | 2318767 A | * | 5/1998 | B60R 21/23138 |

* cited by examiner

FOLDING METHOD OF FAR-SIDE AIRBAG APPARATUS

CROSS-REFERENCES TO RELATED APPLICATIONS

The present application claims priority to Korean application number 10-2018-0091776, filed on Aug. 7, 2018, which is incorporated by reference in its entirety.

BACKGROUND OF THE INVENTION

The present invention relates to a folding method of a far-side airbag apparatus, and more particularly, to a folding method of a far-side airbag apparatus, which can prevent an airbag cushion from interfering with a driver's body when the airbag cushion is deployed.

In general, a vehicle includes airbags installed to protect a passenger. The airbags are installed at various positions depending on body parts to be protected by the airbags. A far-side airbag is disposed between a driver seat and a passenger seat. When a side-on collision occurs, the far-side airbag is deployed upward to prevent a collision between a driver and a passenger seated beside the driver. The far-side airbag has a large size and volume so as to be suppressed from bending toward the passenger seat when the passenger seat is empty.

However, the far-side airbag according to the related art includes a cushion whose bottom is so wide as to constrain the body of the driver. Thus, when the far-side airbag is inboard folded, the far-side airbag may interfere with the arm and body of the driver while deployed.

Furthermore, when the upper portion of the far-side airbag is folded once to avoid the interference with the arm and body or to control the deployment direction, the size of an airbag package may be increased to make it difficult to assemble the airbag apparatus.

Therefore, there is a demand for a device capable of solving the problem.

SUMMARY OF THE INVENTION

Embodiments of the present invention are directed to a folding method of a far-side airbag apparatus, which can prevent an airbag cushion from interfering with a driver's body when the airbag cushion is deployed.

In one embodiment, a folding method of a far-side airbag apparatus may include: a first folding step of folding an upper portion of an airbag sheet toward an inboard side; a second folding step of folding both widthwise sides of the airbag sheet toward an outboard side; a third folding step of folding the upper portion of the airbag sheet toward the inboard side; and a fourth folding step of roll-folding the airbag sheet.

The second folding step may include forming a second folding part by turning over the airbag sheet of which the upper portion is folded and then folding both sides of the airbag sheet.

The second folding part may be folded toward the outboard side.

In the second folding step, the second folding part formed on one side of the airbag sheet may have a different widthwise length from the second folding part formed on the other side of the airbag sheet.

The third folding step may include forming a third folding part by turning over the airbag sheet turned over in the second folding step again and then folding the upper portion of the airbag sheet.

The third folding part may be folded toward the inboard side.

The airbag sheet may be turned over again by bending and rotating the airbag sheet toward the rear of a fixing stud.

The fourth folding step may include roll-folding the airbag sheet toward the outboard side.

The folding method may further include a tether installation step of passing an upper portion of a tether through the airbag sheet and fixing both sides of the tether to a fixing stud, before the first folding step.

In the tether installation step, the tether may be passed through inactive areas of the airbag sheet, and disposed on the inboard side of the airbag sheet via the upper portion of the airbag sheet.

The inactive areas may be formed at the inside and top of the airbag sheet such that the tether is passed through the inactive areas.

In accordance with the embodiment of the present invention, since the folding parts of the airbag sheet are released and expanded toward the outboard side, the airbag cushion can be prevented from interfering with the arm and body of a driver, when the airbag cushion is expanded.

Furthermore, since the airbag sheet can be prevented from interfering with the body of the driver when the airbag sheet is deployed, the deployment and protection performance of the airbag cushion can be secured.

DESCRIPTION OF SPECIFIC EMBODIMENTS

Hereafter, a folding method of a far-side airbag apparatus in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
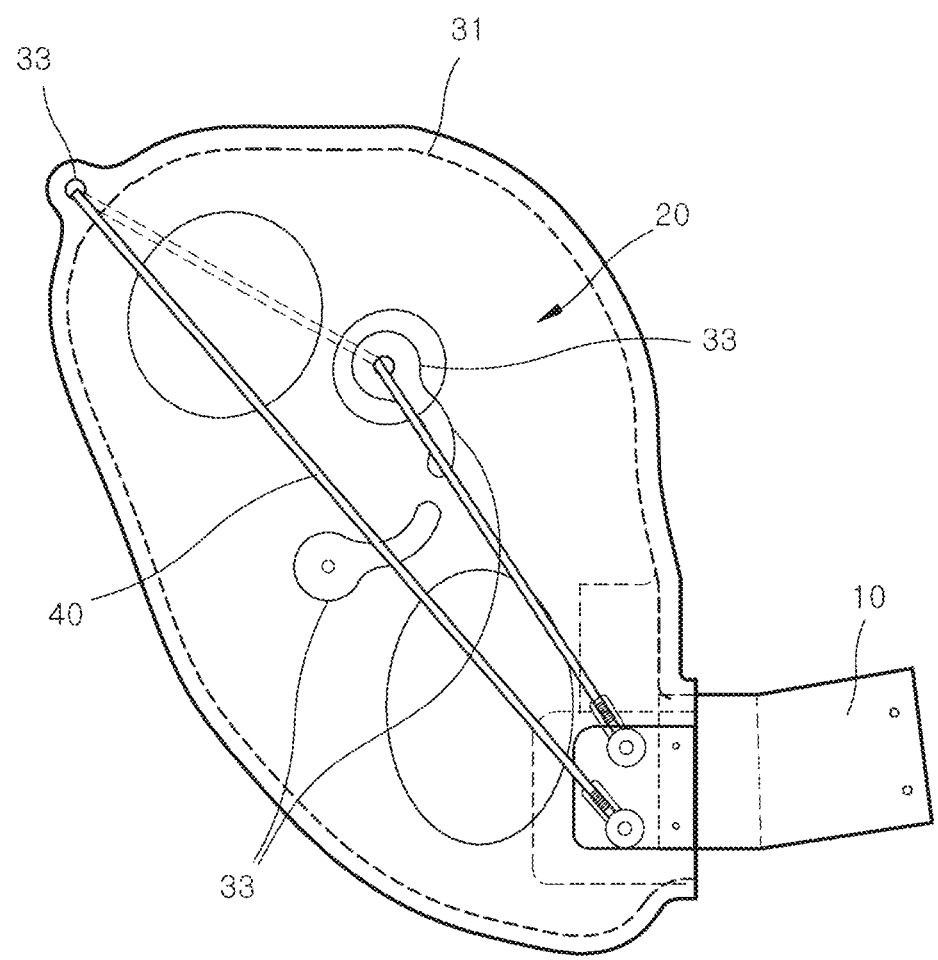
FIG. 1 is a plan view illustrating that a far-side airbag apparatus in accordance with an embodiment of the present invention is unfolded.
Figure 2:
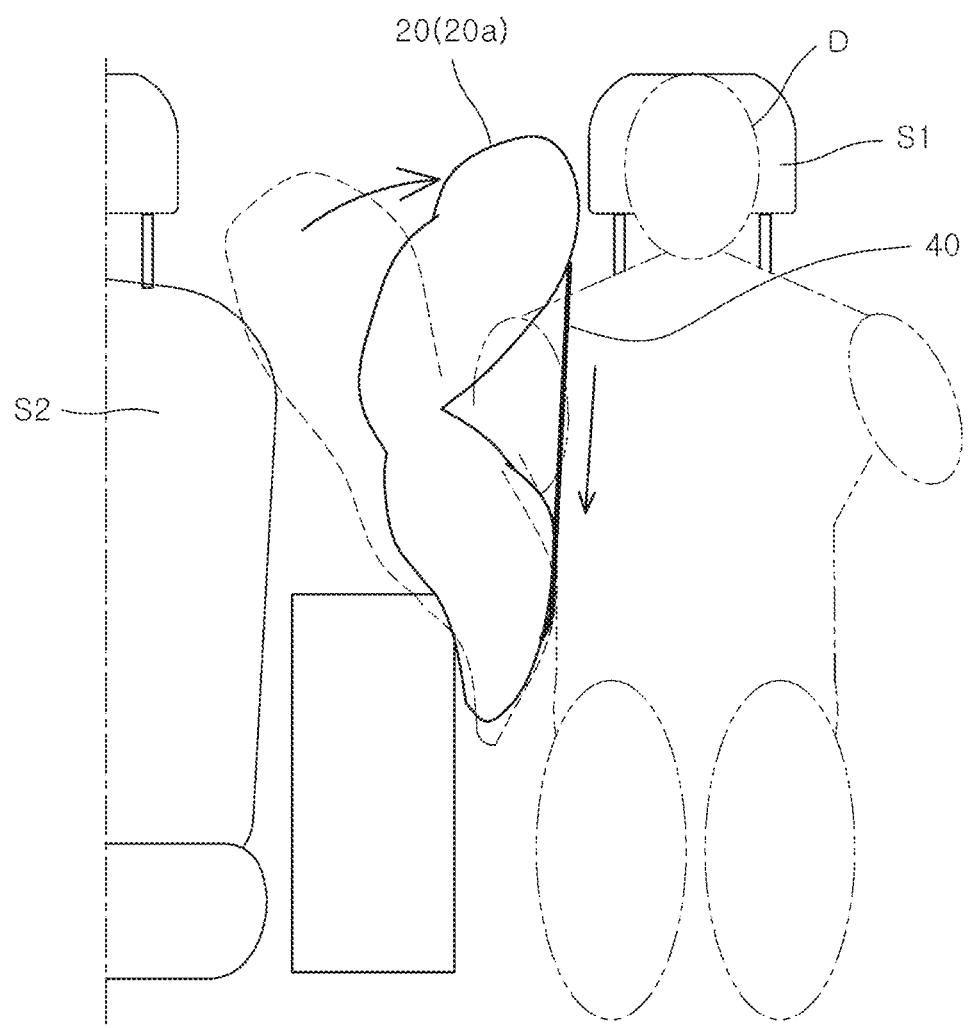
FIG. 2 is a plan view illustrating a process in which the far-side airbag apparatus in accordance with the embodiment of the present invention is deployed.

FIG. 1 is a plan view illustrating that a far-side airbag apparatus in accordance with an embodiment of the present invention is unfolded, and FIG. 2 is a plan view illustrating a process in which the far-side airbag apparatus in accordance with the embodiment of the present invention is deployed.

Referring to FIGS. 1 and 2, the far-side airbag apparatus in accordance with the embodiment of the present invention may include an airbag sheet 20 and a tether 40.

A fixing stud 10 may be connected to the bottom of the airbag sheet 20. The fixing stud 10 may have a stud hole (not illustrated) formed therein. The edge of the airbag sheet 20 may be sewed by an edge sewing part 31. When gas is injected into the airbag sheet 20, the airbag sheet 20 may be expanded and deployed. The deployed airbag sheet 20 may be referred to as an airbag cushion 20a.

Both sides of the tether 40 may be fixed to the fixing stud 10, and an upper portion of the tether 40 may be installed through the airbag sheet 20. For example, inactive areas 33 into which gas is not injected may be formed around the center of the airbag sheet 20 and at the top of the airbag sheet 20, respectively, and the tether 40 may be passed through the inactive areas 33 and then disposed on the inboard side of the airbag sheet 20 via the upper portion of the airbag sheet 20. The tether 40 may pull the top of the airbag cushion 20a toward the inboard side when the airbag sheet 20 is almost completely deployed, such that the upper portion of the airbag cushion 20a is bent toward the inboard side (toward a driver D). Therefore, even when no passenger is seated in a passenger seat S2 located on one side of the driver seat S1, the airbag cushion 20a may be prevented from being bent toward the passenger seat S2.

Hereafter, a folding method of the far-side airbag apparatus in accordance with the embodiment of the present invention will be described.

Figure 3A:
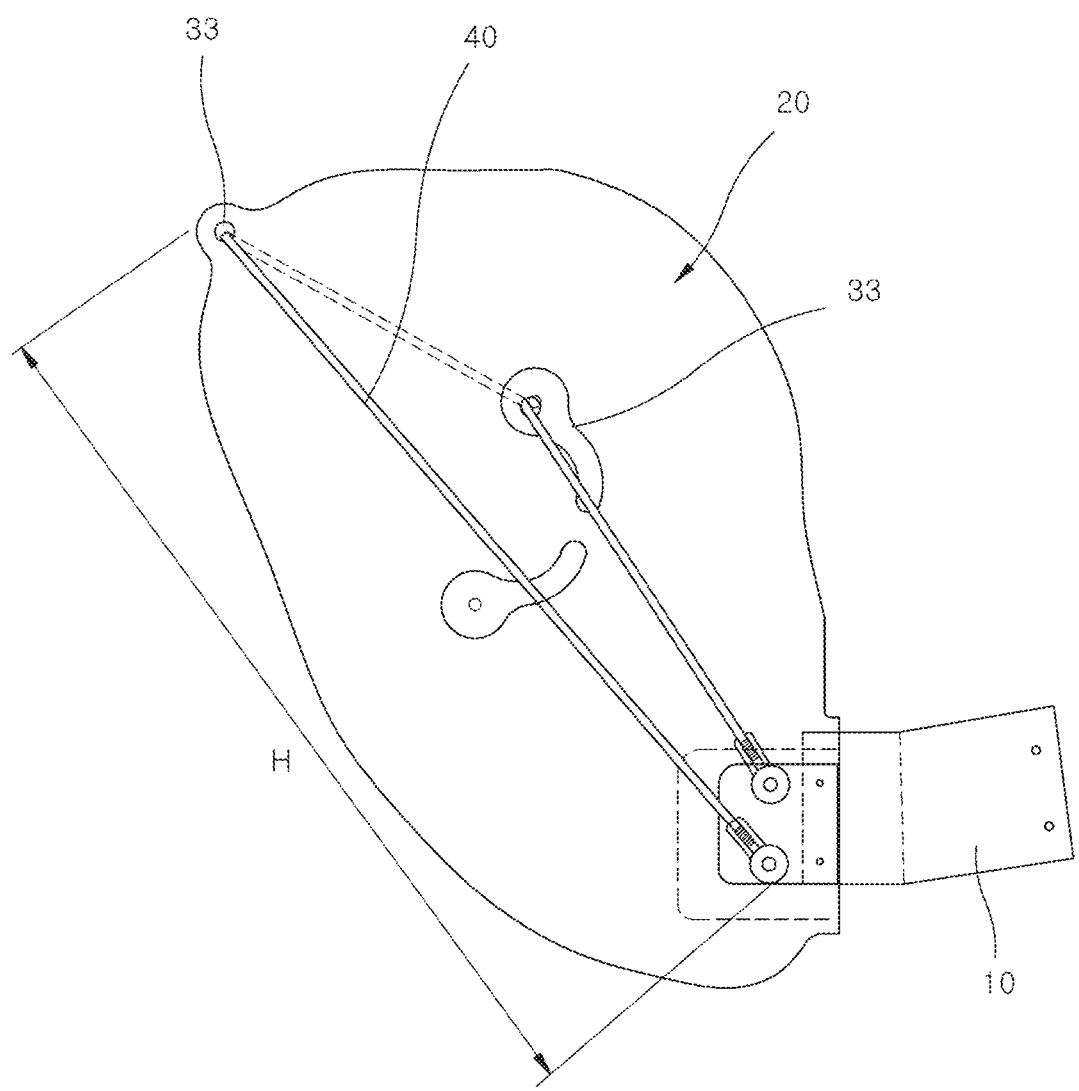
FIG. 3A is a plan view illustrating that an airbag sheet of the far-side airbag apparatus in accordance with the embodiment of the present invention is unfolded in such a manner that an inboard side of the airbag sheet faces upward.
Figure 3B:
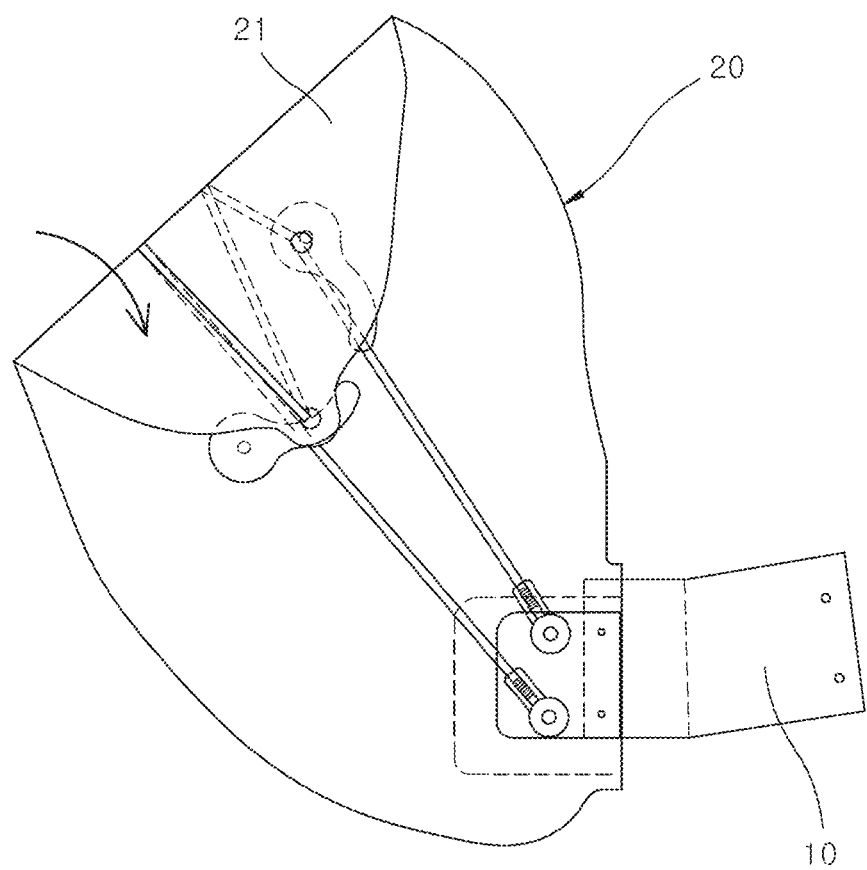
FIG. 3B is a plan view illustrating that an upper portion of the airbag sheet is folded toward the inboard side in the far-side airbag apparatus in accordance with the embodiment of the present invention.
Figure 3C:
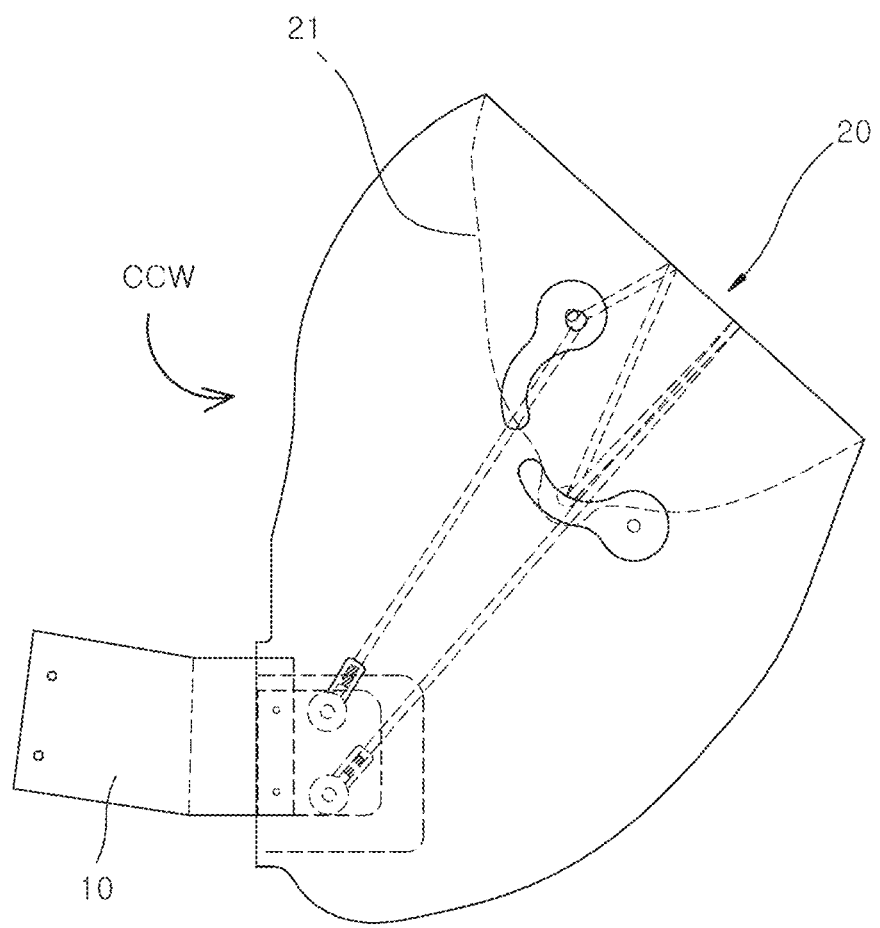
FIG. 3C is a plan view illustrating that the airbag sheet of the far-side airbag apparatus in accordance with the embodiment of the present invention is turned over.
Figure 4A:
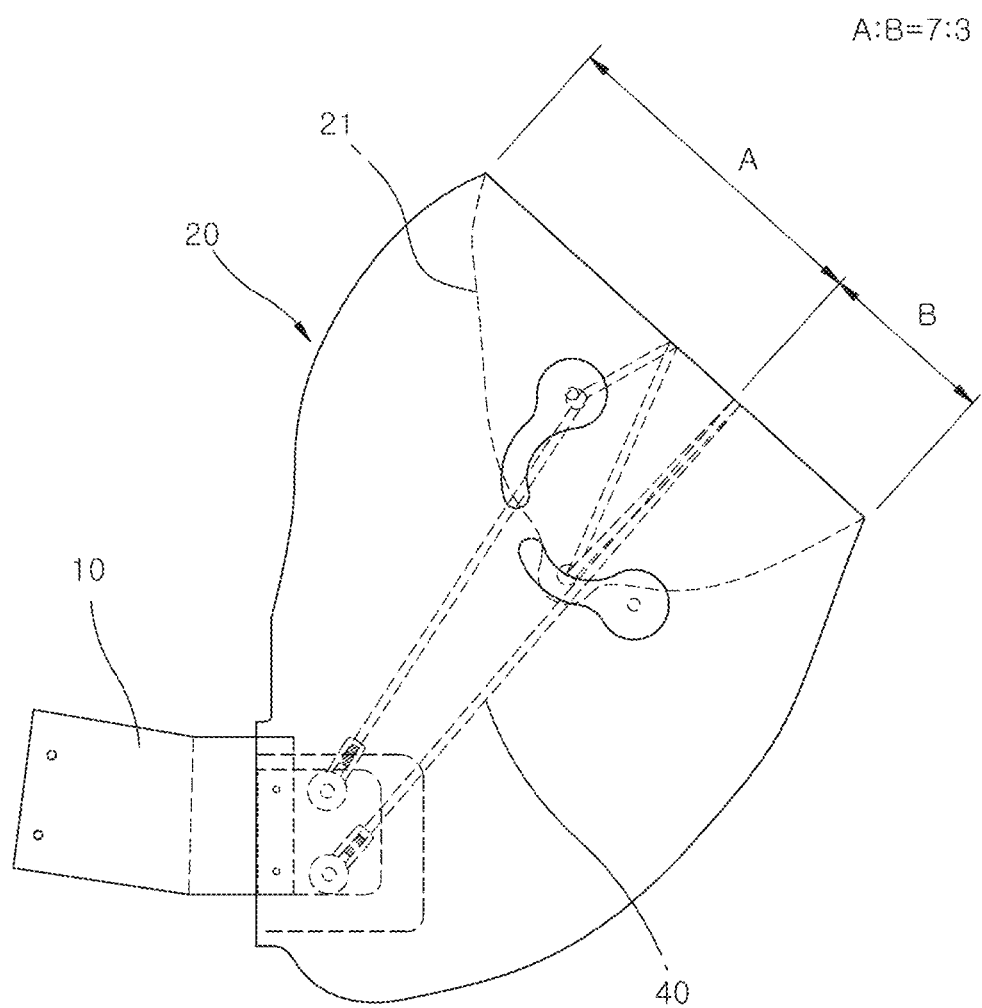
FIG. 4A is a plan view illustrating the ratio of both sides of the airbag sheet, which are folded in the far-side airbag apparatus in accordance with the embodiment of the present invention.
Figure 4B:
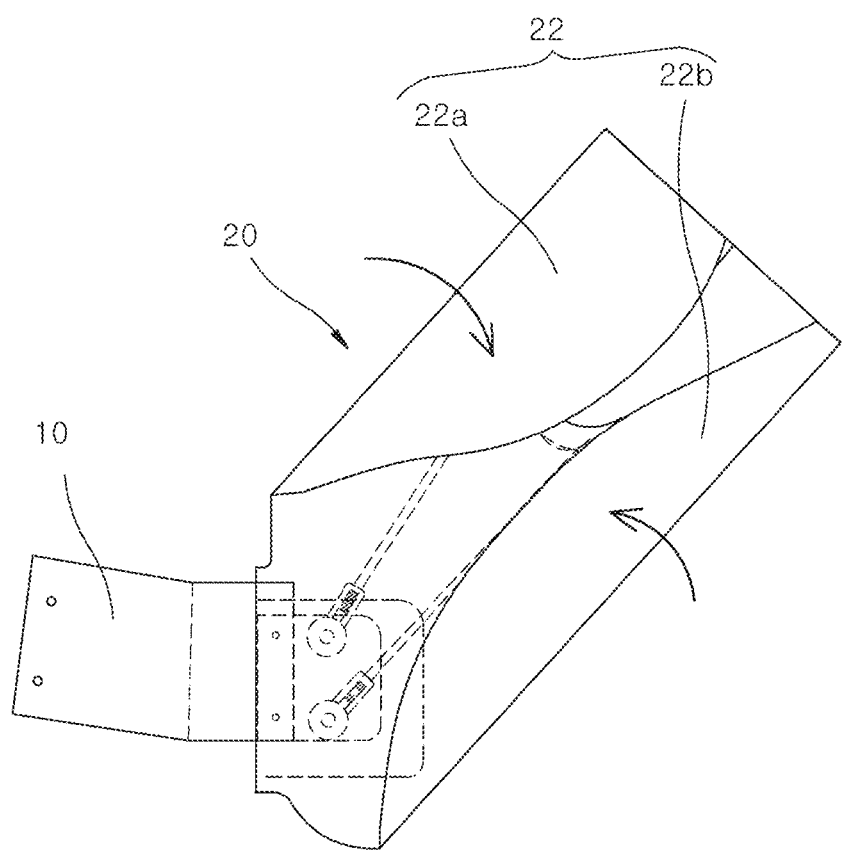
FIG. 4B is a plan view illustrating that both sides of the airbag sheet are folded in the far-side airbag apparatus in accordance with the embodiment of the present invention.
Figure 4C:
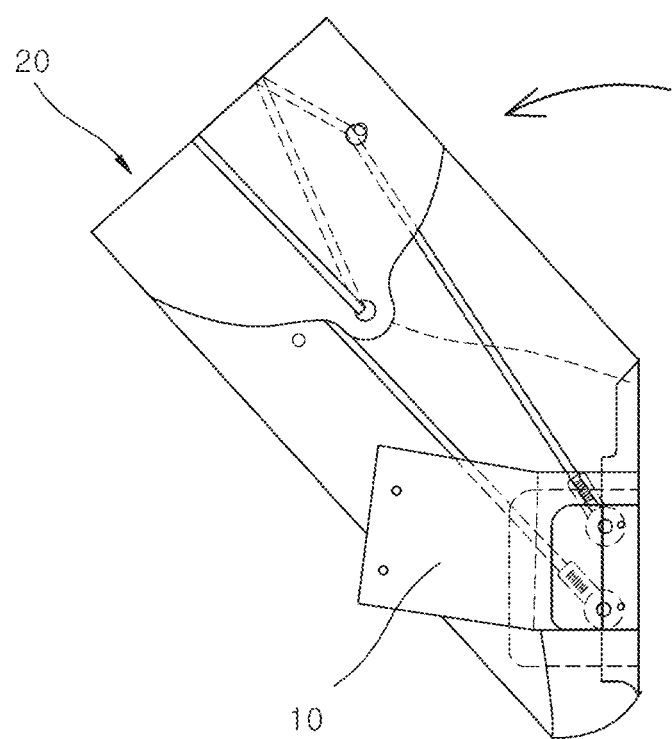
FIG. 4C is a plan view illustrating that the airbag sheet is rotated toward the rear of a fixing stud after both sides of the airbag sheet are folded in the far-side airbag apparatus in accordance with the embodiment of the present invention.
Figure 5A:
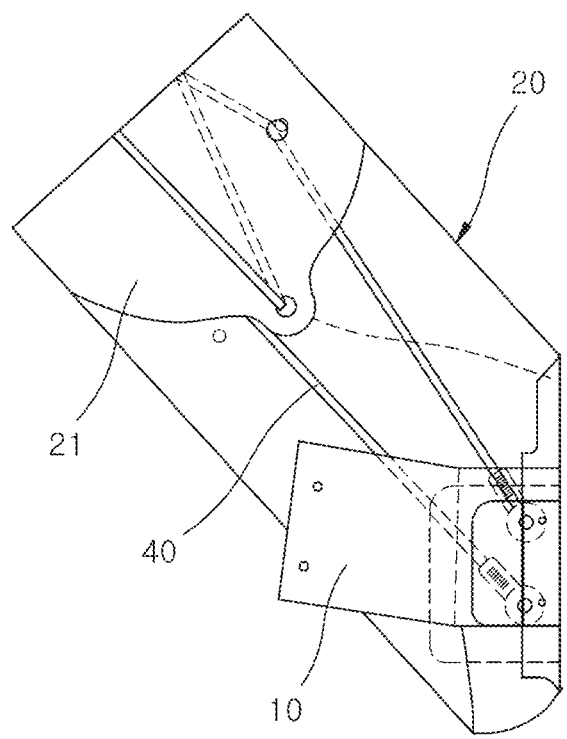
FIG. 5A is a plan view illustrating that the airbag sheet is overlapped by the fixing stud in the far-side airbag apparatus in accordance with the embodiment of the present invention.
Figure 5B:
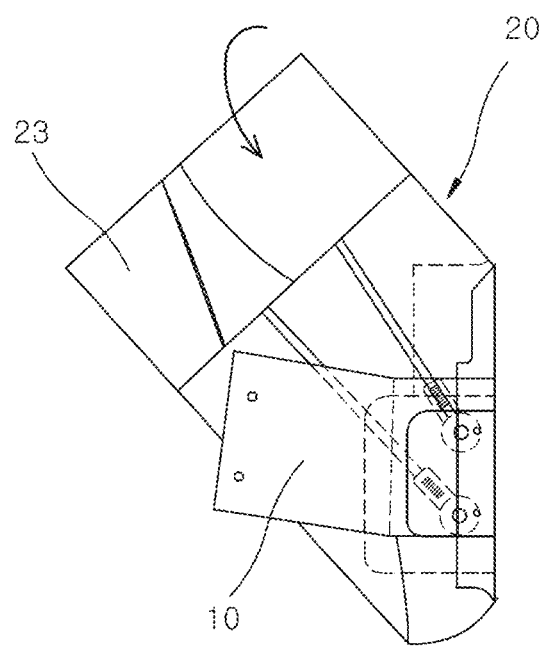
FIGS. 5B to 5D are plan views illustrating a process of roll-folding the airbag sheet toward an outboard side in the far-side airbag apparatus in accordance with the embodiment of the present invention.
Figure 5C:
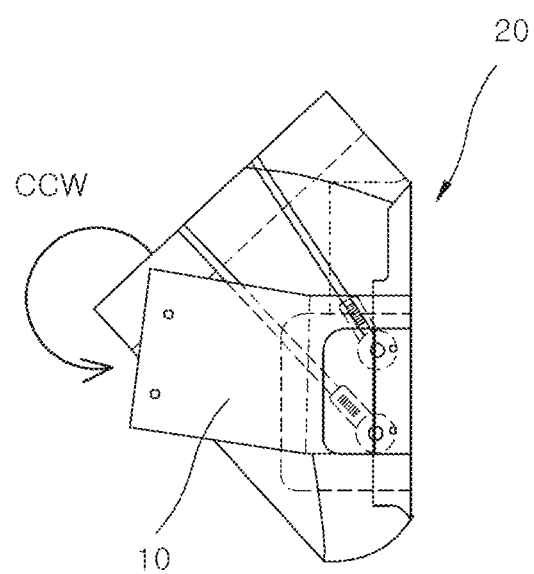
Figure 5D:
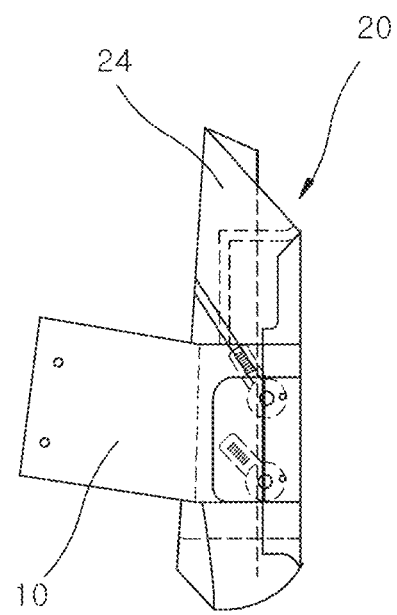

FIG. 3A is a plan view illustrating that the airbag sheet of the far-side airbag apparatus in accordance with the embodiment of the present invention is unfolded in such a manner that the inboard side of the airbag sheet faces upward, FIG. 3B is a plan view illustrating that the upper portion of the airbag sheet is folded toward the inboard side in the far-side airbag apparatus in accordance with the embodiment of the present invention, FIG. 3C is a plan view illustrating that the airbag sheet of the far-side airbag apparatus in accordance with the embodiment of the present invention is turned over with the embodiment of the present invention, FIG. 4A is a plan view illustrating the ratio of both sides of the airbag sheet, which are folded in the far-side airbag apparatus in accordance with the embodiment of the present invention, FIG. 4B is a plan view illustrating that both sides of the airbag sheet are folded in the far-side airbag apparatus in accordance with the embodiment of the present invention, FIG. 4C is a plan view illustrating that the airbag sheet is rotated toward the rear of the fixing stud after both sides of the airbag sheet are folded in the far-side airbag apparatus in accordance with the embodiment of the present invention, FIG. 5A is a plan view illustrating that the airbag sheet is overlapped by the fixing stud in the far-side airbag apparatus in accordance with the embodiment of the present invention, and FIGS. 5B to 5D are plan views illustrating a process of roll-folding the airbag sheet toward an outboard side in the far-side airbag apparatus in accordance with the embodiment of the present invention.

Referring to FIGS. 3A to 5D, the airbag sheet 20 may be evenly spread so that the inboard side of the airbag sheet 20 faces upward. At this time, both sides (solid line portions of FIG. 1) of the tether 40 may be disposed on the inboard side of the airbag sheet 20, and an intermediate portion (dotted line portion of FIG. 1) of the tether 40 may be disposed on the outboard side of the upper portion of the airbag sheet 20. The entire top-to-bottom length of the airbag sheet 20 may be represented by H.

A first folding step of folding the upper portion of the airbag sheet 20 toward the inboard side may be performed. At this time, a first folding part 21 may be formed by folding the airbag sheet 20 by 30% (0.3 H) of the top-to-bottom length of the airbag sheet 20. The first folding part 21 may cover the inactive area 33 formed around the center of the airbag sheet 20.

Then, a second folding step of folding both widthwise sides of the airbag sheet 20 toward the outboard side may be performed. In the second folding step, a second folding part 22 may be formed by turning over the airbag sheet 20 whose upper portion is folded and then folding both widthwise sides of the airbag sheet 20.

In the second folding step, a second folding part 22a formed on one side of the airbag sheet 20 and a second folding part 22b formed on the other side of the airbag sheet 20 may have different widthwise lengths. For example, in the second folding step, an operator may turn over the airbag sheet 20, check a portion at which the widthwise length of the airbag sheet 20 is divided by the ratio of 7:3, fold the second folding part 22a on one side of the airbag sheet 20 such that one end of the airbag sheet 20 is positioned on a virtual line of the airbag sheet 20, which divides the widthwise length of the airbag sheet 20 at the ratio of 7:3, and fold the second folding part 22a on the other side of the airbag sheet 20 such that that the other end of the airbag sheet 20 is positioned on the virtual line of the airbag sheet 20. At this time, the entire widthwise length of the airbag sheet 20 may correspond to 60% of the initial widthwise length of the airbag sheet 20.

A third folding step of folding the upper portion (where the first folding part 21 is formed) of the airbag sheet 20 toward the inboard side may be performed. For example, in the third folding step, the airbag sheet 20 turned over in the second folding step may be turned over again, and then the upper portion of the airbag sheet 20 may be folded. At this time, when the folded airbag sheet 20 is bent and rotated toward the rear of the fixing stud 10 in a state where the position of the fixing stud 10 is fixed, the airbag sheet 20 may be turned over again. At this time, the first folding part 21 of the airbag sheet 20 may be seen, and the position of the fixing stud 10 may not be changed. Then, a third folding part 23 of the airbag sheet 20 may be formed by folding the upper portion of the airbag sheet 20 toward the inboard side by 20% (0.2 H) of the entire top-to-bottom length H of the airbag sheet 20.

A fourth folding step of roll-folding the airbag sheet 20 may be performed. In the fourth folding step, the airbag sheet 20 may be roll-folded toward the outboard side (counterclockwise direction) to form a roll folding part 24. Roll folding may indicate that the airbag sheet 20 is wound like a roll of paper.

The folding method of the far-side airbag apparatus may further include a tether installation step of passing the upper portion of the tether 40 through the airbag sheet 20 and fixing both sides of the tether 40 to the fixing stud 10. The tether 40 may pull the top of the airbag cushion 20a toward the inboard side when the airbag sheet 20 is almost completely deployed, thereby bending the upper portion of the airbag cushion 20a toward the inboard side (toward the driver D).

In the tether installation step, the tether 40 may be passed through the inactive areas 33 of the airbag sheet 20, and disposed on the inboard side of the airbag sheet 20 via the upper portion of the airbag sheet 20. Therefore, the lower portion of the tether 40 may be disposed on the inboard side (front in FIG. 1) of the airbag sheet 20, and the upper portion of the tether 40 may be disposed on the outboard side (rear in FIG. 1) of the airbag sheet 20.

The inactive areas 33 may be formed at the inside and top of the airbag sheet 20 such that the tether 40 is passed through the inactive areas 33. Since the tether 40 is passed through the inactive areas 33, gas injected into the airbag sheet 20 can be prevented from leaking to the outside of the airbag sheet 20.

Hereafter, a deployment process of the far-side airbag apparatus in accordance with the embodiment of the present invention will be described. The airbag sheet 20 may be deployed in the opposite order of the above-described folding order, as gas is injected.

Figure 6A:
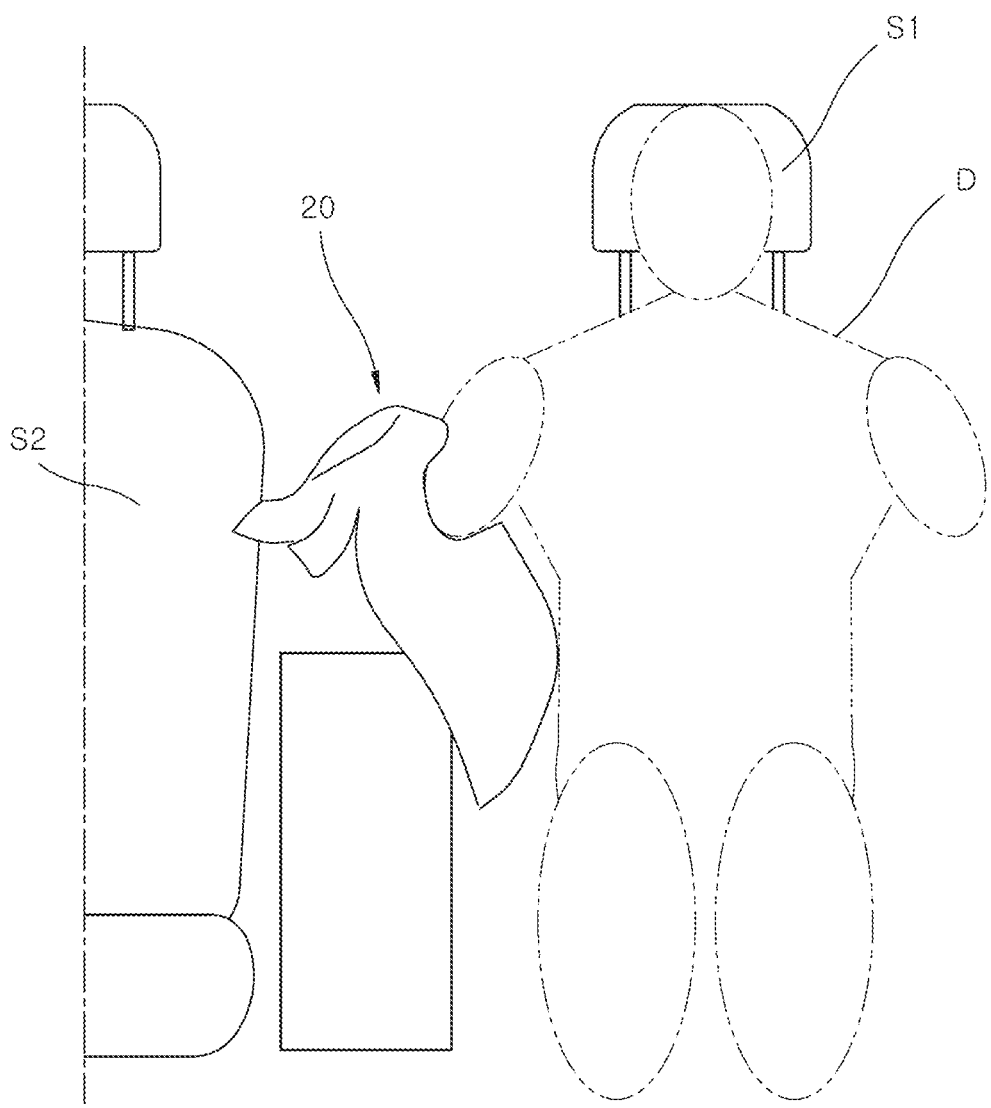
FIG. 6A is a front view illustrating that a roll folding part of an airbag cushion is released and deployed in the far-side airbag apparatus in accordance with the embodiment of the present invention.
Figure 6B:
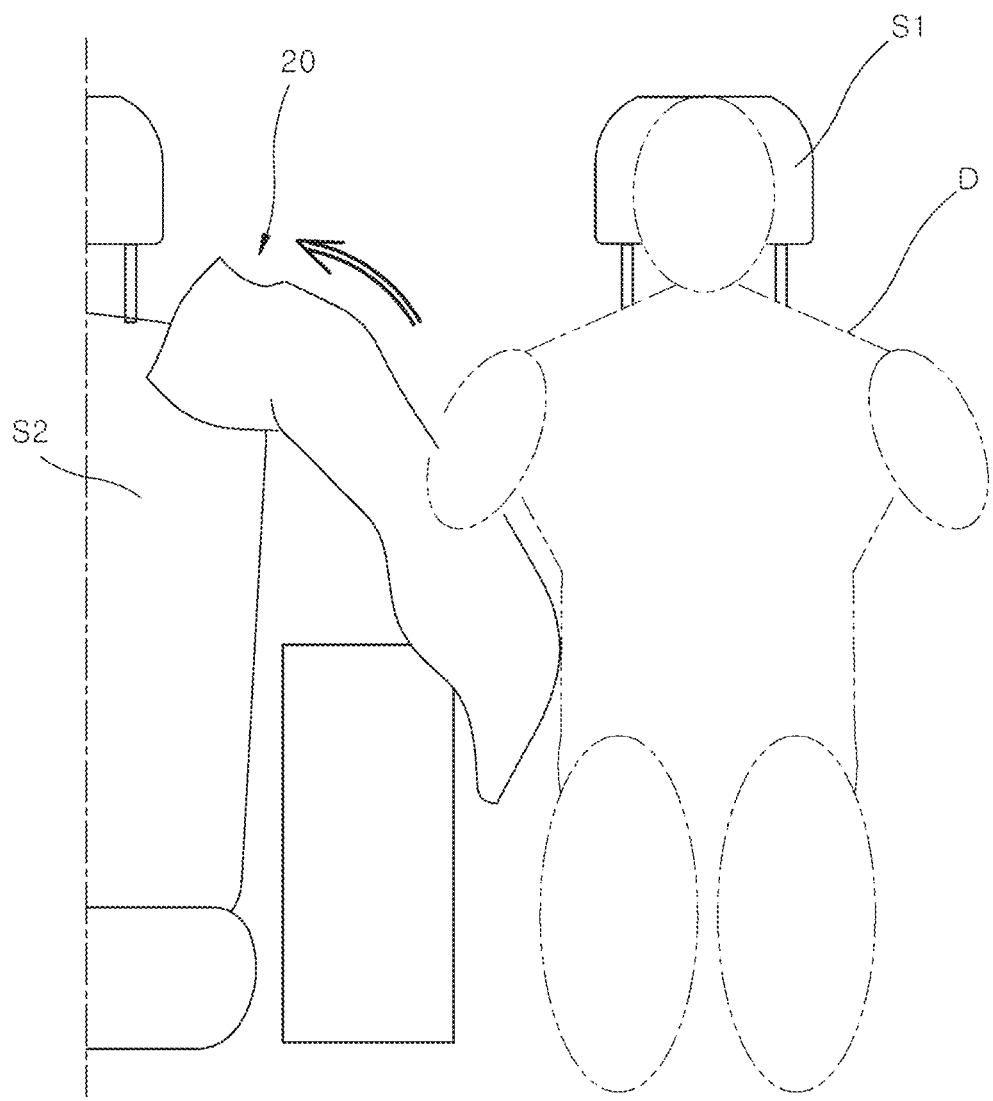
FIG. 6B is a front view illustrating that the roll folding part of the airbag cushion is deployed toward the outboard side in the far-side airbag apparatus in accordance with the embodiment of the present invention.
Figure 6C:
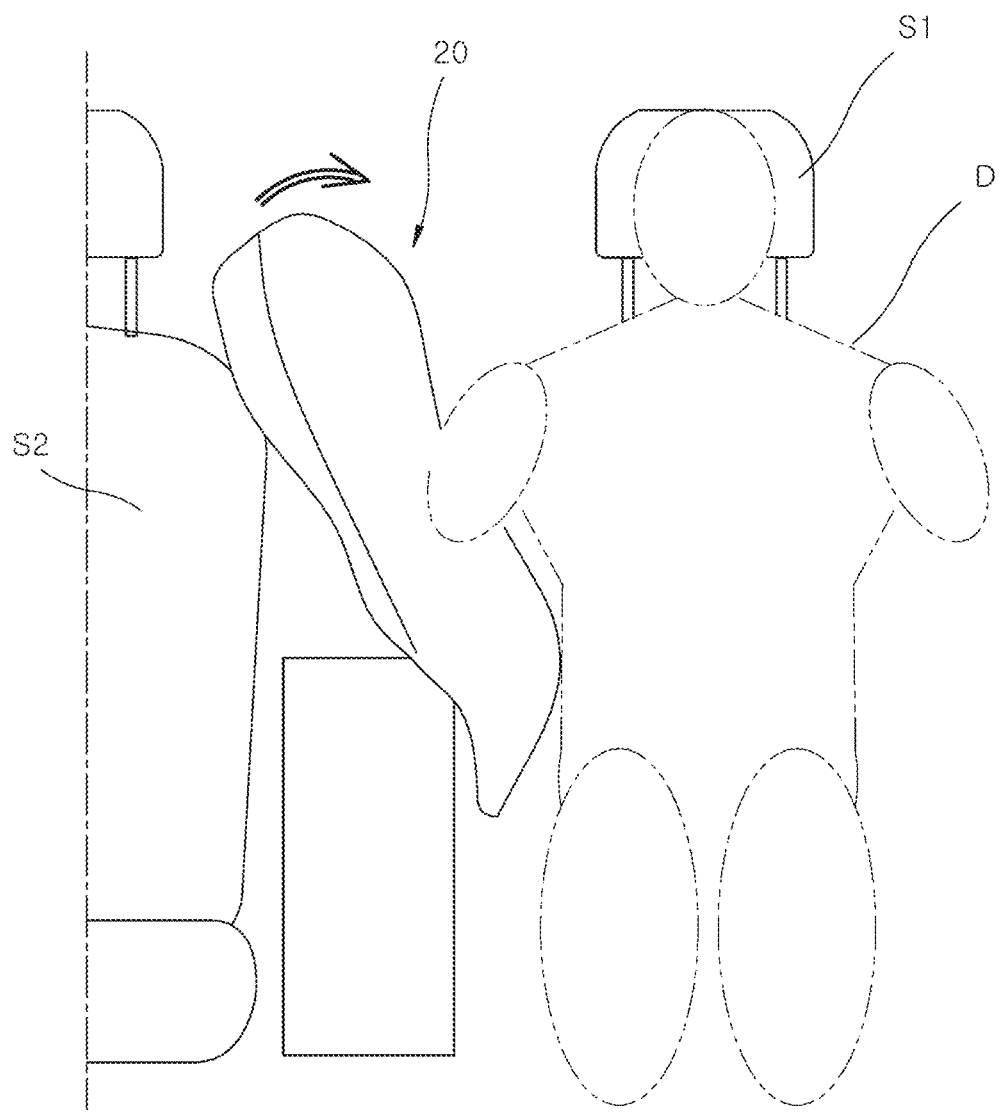
FIGS. 6C and 6D are front views illustrating that the airbag cushion is deployed toward the inboard side in the far-side airbag apparatus in accordance with the embodiment of the present invention.
Figure 6D:
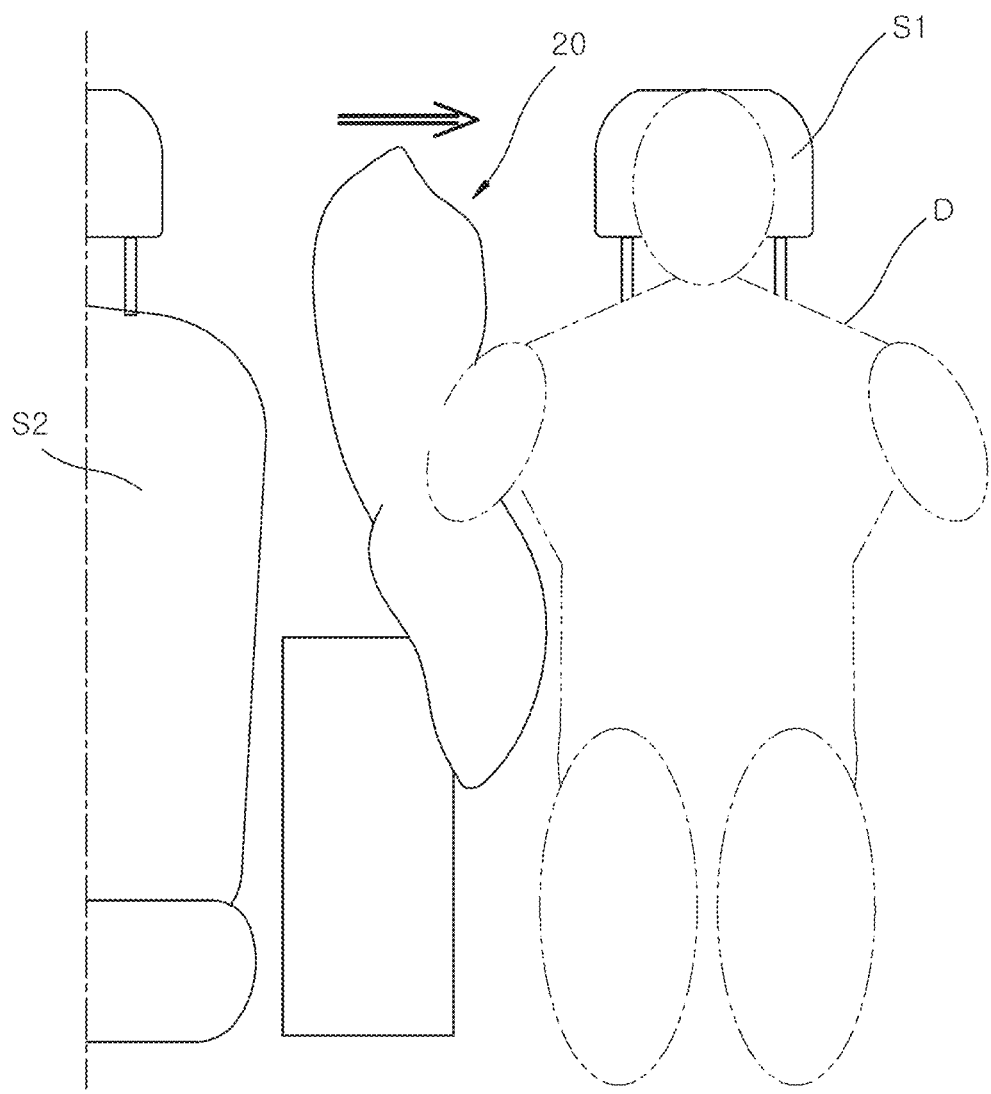
Figure 6E:
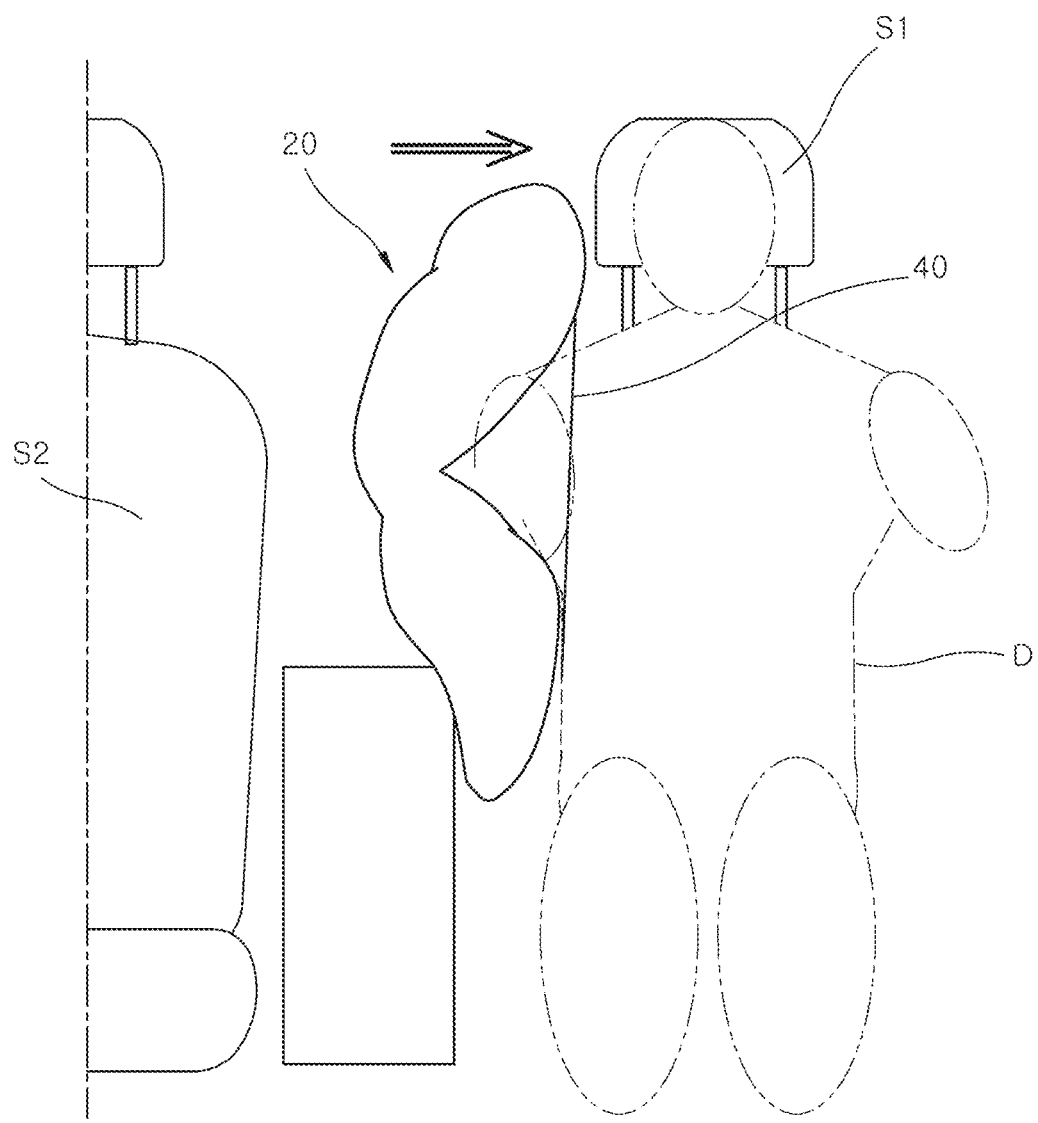
FIG. 6E is a front view illustrating that the central portion of the airbag cushion is bent in the far-side airbag apparatus in accordance with the embodiment of the present invention.

FIG. 6A is a front view illustrating that the roll folding part of the airbag cushion is released and deployed in the far-side airbag apparatus in accordance with the embodiment of the present invention, FIG. 6B is a front view illustrating that the roll folding part of the airbag cushion is deployed toward the outboard side in the far-side airbag apparatus in accordance with the embodiment of the present invention, FIGS. 6C and 6D are front views illustrating that the airbag cushion is deployed toward the inboard side in the far-side airbag apparatus in accordance with the embodiment of the present invention, and FIG. 6E is a front view illustrating that the central portion of the airbag cushion is bent in the far-side airbag apparatus in accordance with the embodiment of the present invention.

Referring to FIGS. 6A to 6E, when gas is injected into the airbag sheet 20, the roll folding part 24 of the airbag sheet 20 may be released. At this time, since the roll folding part 24 was folded toward the outboard side (counterclockwise direction) in the fourth folding step, the roll folding part 24 may be deployed while the bottom thereof is first released.

Therefore, the roll folding part 24 may be released and expanded toward the outboard side (clockwise direction).

Then, the third folding part 23 folded toward the inboard side may be released and expanded. At this time, the third folding part 23 may be released and expanded toward the outboard side. Since the third folding part 23 is released and expanded toward the outboard side, the third folding part 23 may hardly interfere with the arm and body of a driver while deployed.

As gas is injected into the second folding part 22, the second folding part 22 may be released and expanded toward the outboard side. Then, as gas is injected into the first folding part 21, the first folding part 21 may be released and expanded toward the outboard side. Since the second folding part 22 and the first folding part 21 are deployed toward the outboard side, the airbag cushion 20a may be obliquely deployed toward the outboard side (toward a passenger seat S2).

When the airbag cushion 20a is further deployed, the tether 40 may pull the top of the airbag cushion 20a toward the driver D. Thus, the upper portion of the airbag cushion 20a may face the head of the driver D. Furthermore, since the inactive area 33 which is not expanded is formed around the central portion of the airbag cushion 20a, the central portion of the airbag cushion 20a may be bent as the tether 40 pulls the top of the airbag cushion 20a. Therefore, as the central portion of the airbag cushion 20a is bent, a shoulder receiving part (not illustrated) for the driver D may be concavely formed.

The upper and lower portions of the airbag cushion 20a may have a much larger expansion thickness than the central portion thereof. Therefore, the lower portion of the airbag cushion 20a may be sufficiently expanded to support the waist of the driver D, and the upper portion of the airbag cushion 20a may be positioned closer to the head of the driver D.

Since the first folding part 21, the second folding part 22 and the roll folding part 24 are all released and expanded toward the outboard side, the airbag cushion 20a may be prevented from interfering with the arm and body of the driver D when the airbag cushion 20a is deployed. Furthermore, the internal structure can be simplified, and the weight of the airbag apparatus can be reduced.

Since the airbag sheet 20 can be prevented from interfering with the body of the driver when the airbag sheet 20 is deployed, the deployment and protection performance of the airbag cushion 20a can be secured.

Since the airbag cushion 20a is bent through the inactive areas 33 and the tether 40, the structure of the airbag cushion 20a can be simplified, and the manufacturing cost can be reduced.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:
1. A method of folding a far-side airbag apparatus, comprising:
   a first folding step of folding an upper portion of an airbag sheet toward an inboard side of the airbag sheet;
   a second folding step of folding both widthwise sides of the airbag sheet toward an outboard side of the airbag sheet;

a third folding step of folding the upper portion of the airbag sheet toward the inboard side of the airbag sheet; and a fourth folding step of roll-folding the airbag sheet.

2. The method of claim 1, wherein the second folding step comprises forming a second folding part by turning over the airbag sheet of which the upper portion is folded and then folding both sides of the airbag sheet.

3. The method of claim 2, wherein the second folding part is folded toward the outboard side of the airbag sheet.

4. The method of claim 3, wherein in the second folding step, the second folding part formed on one side of the airbag sheet has a different widthwise length from the second folding part formed on the other side of the airbag sheet.

5. The method of claim 2, wherein the third folding step comprises forming a third folding part by turning over the airbag sheet turned over in the second folding step again and then folding the upper portion of the airbag sheet.

6. The method of claim 5, wherein the third folding part is folded toward the inboard side of the airbag sheet.

7. The method of claim 6, wherein the airbag sheet is turned over again by bending and rotating the airbag sheet toward the rear of a fixing stud.

8. The method of claim 1, wherein the fourth folding step comprises roll-folding the airbag sheet toward the outboard side of the airbag sheet.

9. The method of folding a far-side airbag apparatus, comprising:

a first folding step of folding an upper portion of an airbag sheet toward an inboard side of an airbag sheet;

a second folding step of folding both widthwise sides of the airbag sheet toward an outboard side of the airbag sheet;

a third folding step of folding the upper portion of the airbag sheet toward the inboard side of the airbag sheet;

a fourth folding step of roll-folding the airbag sheet; and a tether installation step of passing an upper portion of a tether through the airbag sheet and fixing both sides of the tether to a fixing stud, before the first folding step.

10. The method of claim 9, wherein in the tether installation step, the tether is passed through inactive areas of the airbag sheet, and disposed on the inboard side of the airbag sheet via the upper portion of the airbag sheet.

11. The method of claim 10, wherein the inactive areas are formed at the inside and top of the airbag sheet such that the tether is passed through the inactive areas.

* * * * *